J. A. PRICE.
CULTIVATOR.

No. 173,238.

Patented Feb. 8, 1876.

WITNESSES:
Francis McArdle
Alex T. Roberts

INVENTOR:
J. A. Price
BY
ATTORNEYS.

UNITED STATES PATENT OFFICE.

JAMES A. PRICE, OF HOUSTON, TEXAS.

IMPROVEMENT IN CULTIVATORS.

Specification forming part of Letters Patent No. 173,238, dated February 8, 1876; application filed October 8, 1875.

*To all whom it may concern:*

Figure 1:
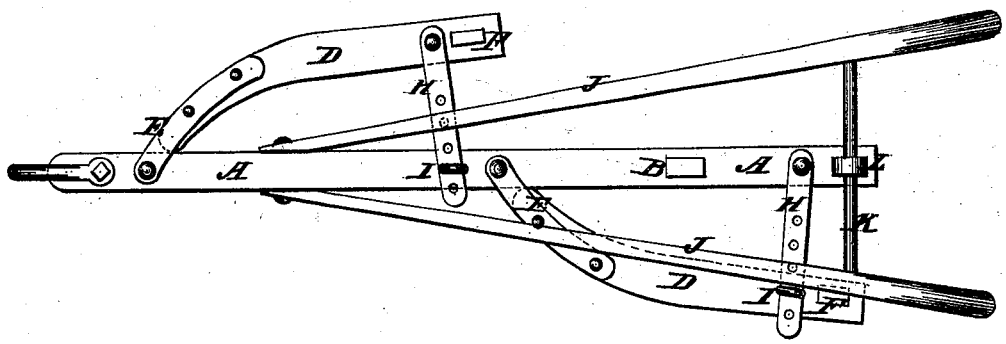
Figure 2:
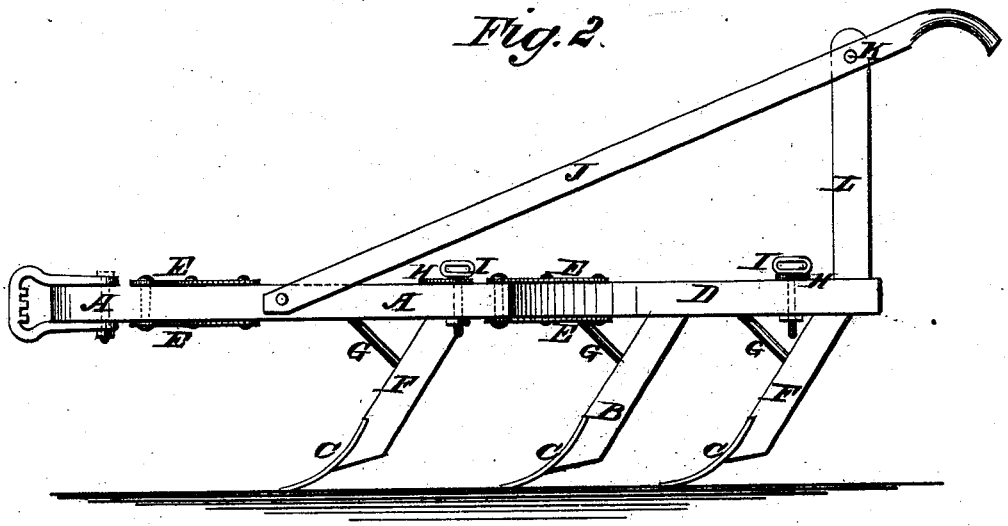

Be it known that I, JAMES A. PRICE, of Houston, in the county of Harris and State of Texas, have invented a new and useful Improvement in Adjustable Cultivators, of which the following is a specification:

Figure 1 is a top view of my improved cultivator. Fig. 2 is a side view of the same.

Similar letters of reference indicate corresponding parts.

The object of this invention is to furnish an improved cultivator or three-shovel plow for field and garden use, which shall be so constructed that it may be readily adjusted for cultivating wider or narrower rows of plants, and which at the same time shall be simple in construction, inexpensive in manufacture, and not liable to get out of order.

The invention consists in the combination of the perforated bars and their screw pins or bolts with the curved side beams, the pivoting-straps, and the main beam, as hereinafter fully described.

A is the main or central beam, to the forward end of which the draft is applied. To the beam A, toward its rear end, is attached a standard, B, to the lower end of which is attached a plow, C. D are two side beams, which are placed upon the opposite sides of the beam A, and the forward ends of which are curved inward, as shown in Fig. 1. To the upper and lower sides of the forward ends of the side beams D are bolted light iron straps E, the ends of which project so as to overlap the upper and lower sides of the main beam A, to which they are pivoted by bolts in such positions that the standards F, attached to the rear ends of said beams D, may be at the proper distance in front and rear of the standard B of the main beam A. To the lower ends of the standards F are attached plows C. The draft-strain upon the standards B and F is sustained by the brace-rods G, the rear ends of which are secured to the said standards B F, and their forward ends are secured to the beams A D. The rear ends of the side beams D are connected with the main beam A by iron bars H, one end of which is secured in place by a bolt, and their other ends by screw pins or bolts I.

Several holes are formed in the bars H to receive the pins I, so that by shifting the said pins from one to another of said holes, the machine may be adjusted to cultivate wider or narrower rows, as may be desired.

J are the handles, the forward ends of which are bolted to the opposite sides of the forward part of the main beam A. The rear ends of the handles J are attached to the ends of a round, K, which passes through and is secured to the upper end of an upright, L. The lower end of the upright L is attached to the rear end of the main beam A.

Having thus described my invention, I claim as new and desire to secure by Letters Patent—

A cultivator provided with rear adjustable side beams D E, one placed in advance of the other, on opposite sides of the main beam, pivoted in front and curved backwardly therefrom, as and for the purpose specified.

JAMES ALVIN PRICE.

Witnesses:
    ED. DUNN,
    N. P. DOLEN.